Figure 1:
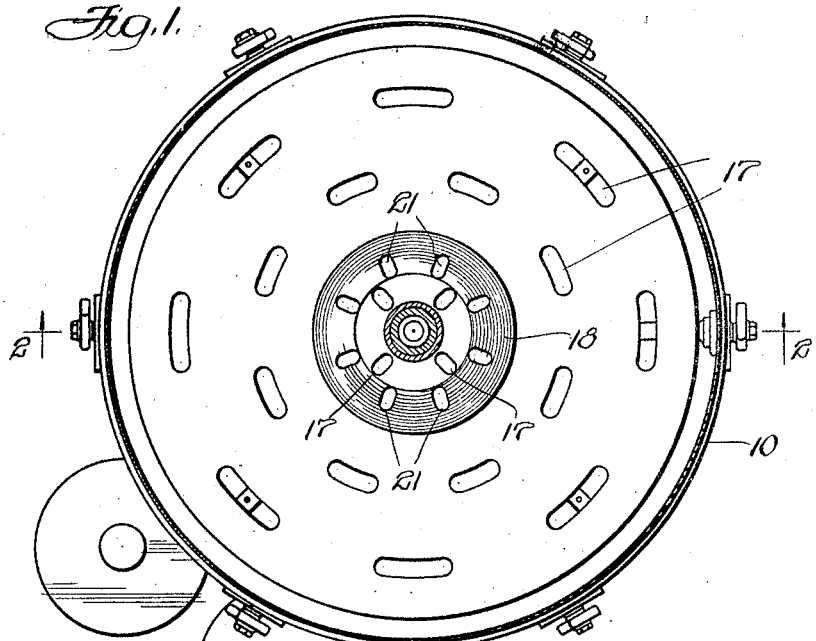

Jan. 15, 1924.

G. E. PELLAM 1,480,567

HEATING AND FILLING MACHINE

Filed Aug. 23, 1922

Inventor:
George E. Pellam
By Jones, Addington, Ames + Seibold Attys

Patented Jan. 15, 1924.

1,480,567

UNITED STATES PATENT OFFICE.

GEORGE E. PELLAM, OF NEWARK, NEW YORK.

HEATING AND FILLING MACHINE.

Application filed August 23, 1922. Serial No. 583,711.

*To all whom it may concern:*

Be it known that I, GEORGE E. PELLAM, a citizen of the United States, residing at Newark, in the county of Wayne and State of New York, have invented new and useful Improvements in Heating and Filling Machines, of which the following is a full, clear, concise, and exact description, reference being had to the accompanying drawing, forming a part of this specification.

My invention relates to heating and filling machines, and more specifically to machines for use in the canning business for heating material such as cut corn and the like and filling it into cans automatically.

One of the objects of my invention is to provide such a machine with means whereby the material delivered to the filling tank will be broken up and evenly distributed and thoroughly heated before it leaves the tank and is delivered to the cans.

A further object of my invention is to provide such a machine with improved means whereby the material in the tank may be heated to a relatively high temperature, above that of steam at atmospheric pressure.

A further object of my invention is to provide a machine of this character with means for pre-heating the material before it is subjected to the direct action of the live steam.

A further object of my invention is to provide such a machine with improved means which will thoroughly agitate, mix, and heat the material in the tank without causing it to foam.

Further objects will appear from the detailed descriptions to follow and from the appended claims.

Figure 2:
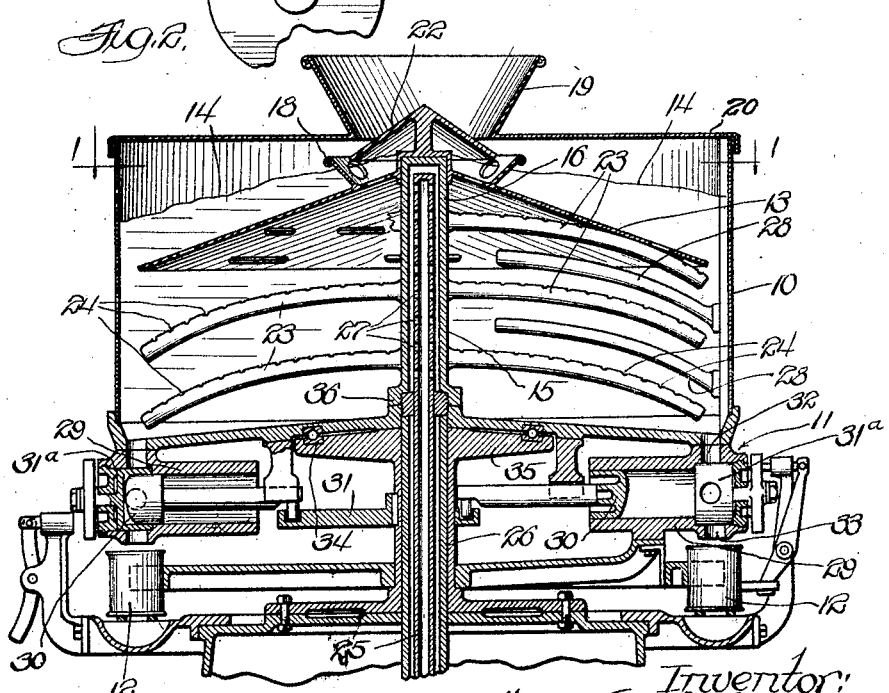

In the drawings in which an embodiment of my invention is shown,

Fig. 1 is a plan view of a heating and filling machine, parts being removed and others shown in section; and Fig. 2 is an axial section of this machine substantially on the line 2—2 of Fig. 1.

Referring now to the drawings in detail, the cooker filler shown comprises a rotatable tank 10, to which the material, such as cut corn or the like, is delivered, means 11 mounted underneath the tank 10 for withdrawing the material from the tank 10 and delivering it to the cans 12, a conical material distributing and heat-retaining partition 13, located in the tank 10, substantially below the level 14 of the material in the tank, and heat distributing means 15, for supplying heat to the material in the tank underneath the partition or bell 13.

The means 11 for withdrawing material from the tank 10 and delivering it to the cans 12 may be of any suitable construction, and will be described somewhat more in detail hereinafter. The conical partition or bell, 13, is stationary, being mounted on the upright centrally located steam header 16, which extends up through the bottom of the tank 10. The partition or bell 13 is provided with a relatively large number of apertures 17 distributed throughout its extent, to permit the semi-fluid material such as cut corn or the like, which is above the partition to pass through these apertures as the material is withdrawn from underneath this partition by the can-supplying means 11.

In order that the material may be evenly distributed to the bell 13, I provide an upstanding flange or collar 18, which, together with the central portion of the bell 13, forms a sort of receiving pan for the incoming material which is supplied through the funnel or hopper 19 of the tank cover 20. This collar or flange also is provided with a plurality of circumferentially distributed apertures 21, through which the corn or other material flows from the distributing pan and thence downwardly along the sloping sides of the bell 13, and through the apertures 17 to the space underneath the bell.

In order to further distribute the corn, and in order to prevent too much of it from passing through the central portion of the cone 13, I provide an additional distributing cone 22, which insures that the corn or other material will be delivered to the outer edge of the receiving pan, rather than to its central portion.

The heat-supplying means 15 comprise in addition to the vertical header member 16, a plurality of radiating arms 23, extending outwardly from and mounted on the central header 16, and provided with apertures 24, through which live steam may be supplied to the material in the tank underneath the partition 13, and a central supply pipe 25, extending through the tubular shaft 26 on which the tank 10 is mounted, and provided with steam supply apertures 27, through which the steam is delivered to the interior of the header 16.

It will be seen that the partition or bell 13, together with the very considerable mass of corn or other material above the partition forms a comparatively tight cover for the corn underneath the partition so that the material underneath the bell may be heated under pressure, that is to say the steam can be supplied under a substantial pressure, so that it may be heated to a temperature well above 212° Fahrenheit.

It will also be seen that the corn above the bell will be pre-heated to some extent, because of the numerous openings 17 in the bell, and because of the fact that the outer edge of the bell is spaced somewhat from the inner wall of the tank.

The radiating heat-distributing arms 23 have an additional function, in that they co-operate with the moving stirring arms 28 (which are mounted on the tank 10 and rotate therewith) passing between the heat distributing arms 23, and thoroughly agitating and mixing the corn underneath the bell 13. In connection with this, it will be noted that the bell 13 also performs an additional function, in that it prevents "foaming" of the material in the tank. If it were not for this bell, the agitation produced by the stirring arms 28 added to the effect of injecting live steam into the mass of corn would cause foam to be formed and come to the surface of the mixture, in sufficient quantities to cause trouble. This "foaming" is entirely done away with in my machine as the bell prevents any substantial amount of the steam from reaching the top layer and substantially confines the agitation of the material to that portion underneath the bell.

While the details of the construction of the mechanism 11 for withdrawing the material from the tank and discharging it into the cans form no part of the invention claimed in this application, it is stated that this mechanism comprises a plurality of cylinders 29, a plurality of plungers or pistons 30 operating in these cylinders and controlled by a stationary cam 31, and a plurality of oscillatable valves 31ª, one for each cylinder, for controlling the passage 32 between the tank and the cylinder and also for controlling the discharge passage 33 from the cylinder into the can.

As the tank rotates, the plungers or pistons 30 are caused to travel back and forth in their respective cylinders, and the oscillatable valves 31 are caused to operate at the proper time to cause the material to be withdrawn from the tank and discharged into the can.

The tank 10 may be supported by anti-friction means such as ball-bearings 34 on the supporting tables 35. A ground-joint may be provided at 36 between the lower end of the header 16 and the bottom of the tank 10.

The use and operation of the machine has been outlined in connection with the description of the construction. As the tank 10 is rotated, material is supplied to this tank through the hopper or funnel 19, in sufficient quantities to maintain a substantial amount above the bell or partition 13, the material being maintained at about the level indicated at 14. As the tank rotates and material is withdrawn from the bottom of the tank by means of the mechanism 11, the material supplied at the top is first distributed by means of the distributing cone 22 to the outer edges of the receiving pan 18, from whence it flows through the openings 17 in the bell and down along the sloping sides thereof and passes into that part of the tank underneath the bell, where it is thoroughly heated by means of the live steam injected into it from the distributing arms 23, and where it is also thoroughly agitated and mixed by means of the arms 28 co-operating with the radiating heat-distributing arms 23.

While I have shown but one embodiment of my invention, it is obvious that it may be embodied in other forms covered and defined by the appended claims.

Having thus described my invention, what I claim as new and desire to secure by Letters Patent of the United States is:

1. A heating and filling machine for heating and filling semi-fluid material, comprising a cylindrical tank rotatable about a vertical axis, means for withdrawing the heated material from the bottom of the tank and putting it in cans, a stationary material distributing and heat-retaining partition extending across said tank substantially below the level of the material in the tank, means for supplying heat to the material beneath said partition and means for delivering material to said tank above said partition.

2. A heating and filling machine for heating and filling semi-fluid material, comprising a cylindrical tank rotatable about a vertical axis, means for withdrawing the heated material from the bottom of the tank and putting it in cans, a stationary material distributing and heat-retaining partition extending across said tank substantially below the level of the material in the tank, means for supplying heat to the material beneath said partition and means for delivering material to said tank above said partition, said partition being provided with a plurality of openings distributed throughout its extent to permit the material to pass from the upper to the under side of said partition as the material underneath the partition is withdrawn.

3. A heating and filling machine for heating and filling semi-fluid material, comprising a cylindrical tank rotatable about a vertical axis, means for withdrawing the heated material from the bottom of the tank and putting it in cans, a stationary material distributing and heat-retaining partition extending across said tank substantially below the level of the material in the tank, means for supplying heat to the material beneath said partition and means for delivering material to said tank above said partition, said partition being in the form of a cone co-axial with said cylinder, whereby the material supplied to the tank above said partition is distributed evenly over the sloping sides of said partition.

4. A heating and filling machine for heating and filling semi-fluid material, comprising a cylindrical tank rotatable about a vertical axis, means for withdrawing the heated material from the bottom of the tank and putting it in cans, a stationary material distributing and heat-retaining partition extending across said tank substantially below the level of the material in the tank, means for supplying heat to the material beneath said partition and means for delivering material to said tank above said partition, said partition being in the form of a cone co-axial with said tank, and being provided with a plurality of openings distributed throughout its extent, whereby the material supplied to said tank above said partition will be distributed evenly and will flow downwardly along the sloping sides of said partition and through the apertures in said partition as the material underneath said partition is withdrawn.

5. A heating and filling machine for heating and filling semi-fluid materials, comprising a heating tank, means for withdrawing the heated material from the bottom of said tank and putting it into cans, a substantially horizontal material distributing and heat-retaining partition extending across said tank substantially below the level of the material in the tank, means for supplying heat to the material beneath said partition, and means for delivering the material to said tank above said partition.

6. A heating and filling machine for heating and filling semi-fluid materials, comprising a heating tank, means for withdrawing the heated material from the bottom of said tank and putting it into cans, a substantially horizontal material distributing and heat-retaining partition extending across said tank substantially below the level of the material in the tank, means for supplying heat to the material beneath said partition, and means for delivering the material to said tank above said partition, said partition being provided with a plurality of apertures distributed throughout its extent, to permit the material above said partition to flow through said apertures as the material underneath said partition is withdrawn.

7. A heating and filling machine for heating and filling semi-fluid materials, comprising a heating tank, means for withdrawing the heated material from the bottom of said tank and putting it into cans, a substantially horizontal material distributing and heat-retaining partition extending across said tank substantially below the level of the material in the tank, means for supplying heat to the material beneath said partition, and means for delivering the material to said tank above said partition, said partition being in the form of a cone having its axis centrally located with respect to said tank, whereby the material delivered to said tank above said partition will flow evenly over the sloping sides of said partition.

8. A heating and filling machine for heating and filling semi-fluid materials, comprising a heating tank, means for withdrawing the heated material from the bottom of said tank and putting it into cans, a substantially horizontal material distributing and heat-retaining partition extending across said tank substantially below the level of the material in the tank, means for supplying heat to the material beneath said partition, and means for delivering the material to said tank above said partition, said partition being in the form of a cone having a vertical axis centrally located with respect to said tank, and provided with a plurality of apertures distributed throughout its extent, whereby the material delivered to said tank above said partition will be distributed evenly over the sloping sides of said partition and will flow through the apertures in said partition as the material underneath said partition is withdrawn.

9. A heating and filling machine for heating and filling semi-fluid material, comprising a cylindrical tank rotatable about a vertical axis, means for withdrawing the heated material from the bottom of the tank and putting it in cans, a stationary material distributing and heat-retaining partition extending across said tank substantially below the level of the material in the tank, means for supplying heat to the material beneath said partition and means for delivering material to said tank above said partition, said partition being provided with a plurality of openings distributed throughout its extent to permit the material to pass from the upper to the under side of said partition as the material underneath the partition is withdrawn, and means for agitating the material underneath said partition.

10. A heating and filling machine for heating and filling semi-fluid material, comprising a cylindrical tank rotatable about a vertical axis, means for withdrawing the heated material from the bottom of the tank and putting it in cans, a stationary material distributing and heat-retaining partition extending across said tank substantially below the level of the material in the tank, means for supplying heat to the material beneath said partition and means for delivering material to said tank above said partition, said means for supplying heat comprising a vertical header located centrally with respect to said tank and supporting said partition, and carrying a plurality of radially extending heat distributing pipes, and a plurality of arms mounted on the sides of said tank and co-operating with said heat-distributing arms to agitate the material underneath said partition.

11. A heating and filling machine for heating and filling semi-fluid material comprising a tank, means for withdrawing material from the bottom of said tank and putting it in cans, a material distributing and heat-retaining partition extending across said tank substantially below the level of the material in the tank, means for supplying heat to the material beneath said partition, and means for delivering material to said tank above said partition, said partition being in the form of a cone having a vertical axis centrally located with respect to said tank, said partition being provided with an annular upstanding flange co-axial with said partition, forming a receiving pan for the material supplied to the tank.

12. A heating and filling machine for heating and filling semi-fluid material comprising a tank, means for withdrawing material from the bottom of said tank and putting it in cans, a material distributing and heat-retaining partition extending across said tank substantially below the level of the material in the tank, means for supplying heat to the material beneath said partition, and means for delivering material to said tank above said partition, said partition being in the form of a cone having a vertical axis centrally located with respect to said tank, said partition being provided with an annular upstanding flange co-axial with said partition, forming a receiving pan for the material supplied to the tank, and a distributing cone co-axial with said partition and upstanding flange for distributing the material to the outer edge of said receiving pan.

13. A heating and filling machine for heating and filling semi-fluid material comprising a tank, means for withdrawing material from the bottom of said tank and putting it in cans, a material distributing and heat-retaining partition extending across said tank substantially below the level of the material in the tank, means for supplying heat to the material beneath said partition, and means for delivering material to said tank above said partition, said partition being in the form of a cone having a vertical axis centrally located with respect to said tank, said partition being provided with an annular upstanding flange co-axial with said partition, forming a receiving pan for the material supplied to the tank, said upstanding flange being provided with a plurality of circumferentially distributed apertures to permit the material in said receiving pan to flow through said apertures and down over the sloping sides of said partition.

14. A heating and filling machine for heating and filling semi-fluid material comprising a tank, means for withdrawing the heated material from the bottom of the tank and putting it in cans, a material distributing and heat-retaining partition extending across said tank substantially below the level of the material in the tank, means for delivering material to said tank above said partition, and means for supplying heat to the material beneath said partition, comprising a vertical header centrally located with respect to said tank and supporting said partition.

In witness whereof, I have hereunto subscribed my name.

GEO. E. PELLAM.

Witnesses:
PETER R. SLEIGHT,
GEORGE A. SLEIGHT.